Figure 1:
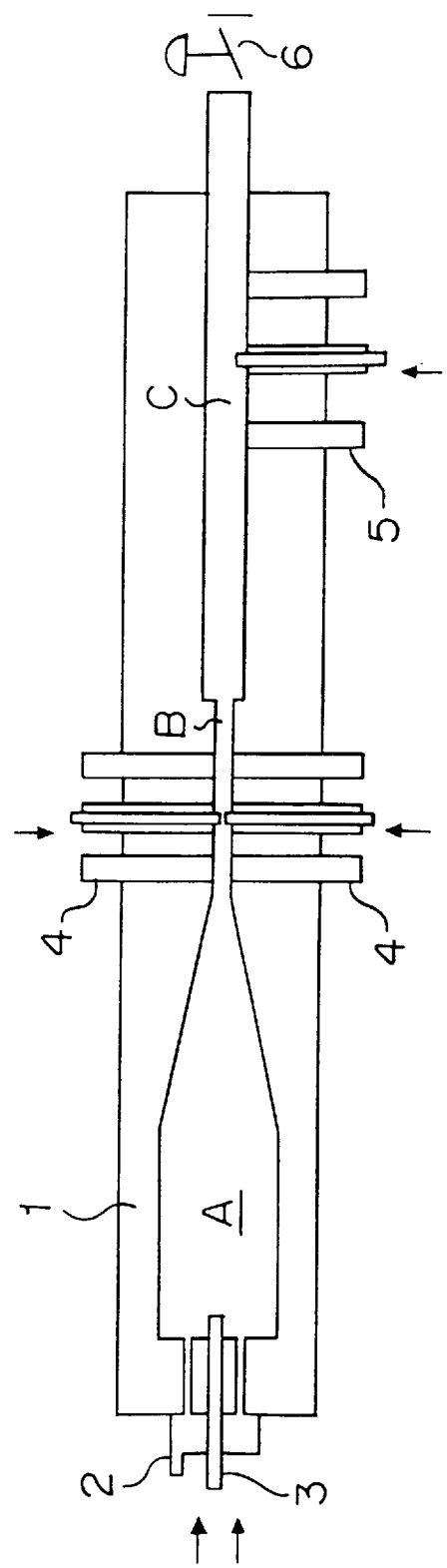

United States Patent [19]

Mise et al.

[11] Patent Number: 5,772,975
[45] Date of Patent: Jun. 30, 1998

[54] CARBON BLACK

[75] Inventors: Nobutake Mise; Yutaka Fukuyama; Mamoru Nakayama; Shigeru Kawakami, all of Kitakyushu, Japan

[73] Assignee: Mitsubishi Chemical Corporation, Tokyo, Japan

[21] Appl. No.: 806,657

[22] Filed: Feb. 26, 1997

[30] Foreign Application Priority Data

Feb. 28, 1996 [JP] Japan ..................................... 8-041445

[51] Int. Cl.$^6$ ..................................................... C09C 1/48
[52] U.S. Cl. ....................................................... 423/449.1
[58] Field of Search .......................... 423/449.1; 524/495

[56] References Cited

U.S. PATENT DOCUMENTS 5,262,146  11/1993  Kanamon et al. ...................... 423/458

FOREIGN PATENT DOCUMENTS

| 0 600 195 | 6/1994 | European Pat. Off. . |
| 2 652 586 | 4/1991 | France . |
| WO 92/04415 | 3/1992 | WIPO . |
| WO 94/19412 | 9/1994 | WIPO . |

OTHER PUBLICATIONS

Database WPI, Derwent Publications, AN 94–245752, JP 06 179 744, Jun. 28, 1994.

Patent Abstracts of Japan, vol. 8, No. 199, (C–242), Sep. 12, 1984, JP 59 089339, May 23, 1984.

*Primary Examiner*—Michael Lewis
*Assistant Examiner*—Stuart L. Hendrickson
*Attorney, Agent, or Firm*—Oblon, Spivak, McClelland, Maier & Neustadt, P.C.

[57] ABSTRACT

A carbon black having a D½/Dmod ratio of at most 0.53.

4 Claims, 1 Drawing Sheet

CARBON BLACK

The present invention relates to coloring furnace carbon black which is useful as a black pigment for resin coloring agents, printing inks or coating materials.

Carbon black has been widely used as a pigment, a filler, a reinforcing pigment or a weather resistance-improving agent. As a method for its production, a furnace type production method is well known wherein a starting material hydrocarbon is introduced into a high temperature combustion gas stream, so that it will be converted to carbon black by a pyrolytic reaction, whereupon the reaction gas is quenched to stop the reaction.

Carbon black to be used as a coloring agent for resin coloring agents, printing inks or coating materials, is desired to be excellent in blackness, dispersibility, gloss and coloring power.

Blackness and coloring power depend largely on the particle size and structure of the carbon black. Namely, it is known that the smaller the particle size, or the lower the structure development, the higher the blackness. The relation between the blackness and the particle size is disclosed, for example, in JP-A-50-68992.

However, when incorporated to a resin or as a vehicle to an ink or a coating material, carbon black with a small particle size will bring about deterioration in the dispersibility or flowability. Likewise, low structure development will bring about deterioration in the dispersibility. Here, functional groups on the surface of carbon black particles serve to suppress the deterioration in the dispersibility or in the flowability due to the small particle size or the low structure development, and the dispersibility will be improved, as functional groups increase. For example, JP-B-46-18368 discloses a method of oxidizing carbon black with ozone. Further, JP-B-52-13808 discloses a method of oxidizing carbon black with hydrogen peroxide. However, not all of such acidic carbon blacks show excellent dispersibility of vehicles.

Carbon black intended for use as a black pigment for a resin coloring agent, a printing ink or a coating material, is desired to satisfy both blackness and dispersibility which are in an antinomic relation to each other.

Namely, it is an object of the present invention to obtain carbon black which has higher blackness and better dispersibility than conventional carbon black.

To accomplish such an object, the present inventors have conducted various studies to obtain carbon black having higher blackness and better dispersibility than conventional carbon black and as a result, have found it possible to accomplish the above object by controlling aggregate size of carbon black and the size distribution of the aggregate. The present invention has been accomplished on the basis of this discovery.

The aggregate is one in which carbon black is in a form similar to a cluster of grapes, and the size of the aggregate is determined by the particle size and the degree of development of the structure. As evaluation indices for the aggregate, the cDBP oil absorption, the disk centrifuge in an aqueous dispersion of carbon black and an electronmicroscopic analysis, are known. For the evaluation of the aggregate size and the size distribution of the aggregate, a disk centrifuge method has recently been commonly employed. It is generally known that the smaller the aggregate, the deeper the blackness. It is possible to make the aggregate small by reducing the particle size and lowering the structure development. On the other hand, such will bring about deterioration in the dispersibility. Under these circumstances, the present inventors have conducted extensive studies and have found it possible to attain good dispersibility while maintaining high blackness by controlling the aggregate size and the size distribution of the aggregate as characteristics other than the particle size and the structure, and the present invention has been accomplished on the basis of this discovery. Namely, the present inventors have analyzed the behavior of carbon black dispersed in a matrix and the factors which influence blackness, and as a result, they have obtained novel carbon black as uniform aggregate free from fine aggregate which adversely affects the dispersibility or large aggregate which adversely affects blackness and have found that such carbon black has a high level of blackness and good dispersibility. Namely, they have obtained novel carbon black having a D½/Dmod ratio of at most 0.53 by controlling Dmod i.e. the stokes diameter at the point of the peak and D½ i.e. the half width of the stokes diameter at the point of the peak in the stokes diameter distribution of aggregate of the carbon black by disk centrifuge.

Thus, the present invention provides a carbon black having a D½/Dmod ratio of at most 0.53.

In the accompanying drawing, FIG. 1 is a cross-sectional view of a carbon black production apparatus whereby the carbon black of the present invention can be produced.

Now, the present invention will be described in detail with reference to the preferred embodiments.

In the present invention, Dmod is the stokes diameter at the point of the peak in the stokes diameter distribution of aggregate of the carbon black by disk centrifuge, and D½ is the half width of such a stokes diameter. The carbon black of the present invention has a feature that the ratio of D½/Dmod is at most 0.53. The D½/Dmod ratio is preferably within a range of from 0.30 to 0.50, and the small aggregate side is preferred in a case where a high degree of blackness is of importance. Dmod is preferably within a range of from 20 to 80 nm, more preferably within a range of from 20 to 60 nm. Further, the cDBP oil absorption is preferably at most 90 cc/100 g, more preferably within a range of from 90 to 30 cc/100 g.

The carbon black of the present invention can be prepared, for example, by the following process.

The process itself, which comprises a combustion step, a reaction step and a step for terminating the reaction, may be the same as a conventional process. Specifically, in the combustion step, in order to form a high temperature combustion gas, air as an oxygen-containing gas, oxygen, or their mixture, and a gaseous or liquid fuel hydrocarbon will be mixed and burned (this zone is called a combustion zone). As the fuel hydrocarbon, hydrogen, carbon monoxide, natural gas, coal gas, petroleum gas, a petroleum type liquid fuel such as heavy oil, or a coal type liquid fuel such as creosote oil, may be used.

In the reaction step, a starting material hydrocarbon is introduced into the high temperature combustion gas stream obtained in the combustion step, as it is jetted from a burner provided in parallel with or in a transverse direction to the high temperature combustion gas stream, whereupon the starting material hydrocarbon is thermally decomposed and converted to carbon black (this zone is called a reaction zone). It is common to provide a throttle portion in the reaction zone in order to improve the reaction efficiency, and the degree of the throttle is such that the ratio of the diameter of the throttle portion to the diameter of the upstream portion of the throttle portion is from 0.1 to 0.8.

The starting material hydrocarbon may, for example, be an aromatic hydrocarbon such as anthracene, a coal type hydrocarbon such as creosote oil, EHE oil (by-product oil during the production of ethylene), or a petroleum type heavy oil such as FCC oil (fluidized catalytic decomposition residual oil).

In the step for terminating the reaction, the high temperature reaction gas is cooled to a level of not higher than 1,000 to 800° C. by e.g. water spray (this zone is called a reaction termination zone). The cooled carbon black can be recovered by a conventional process, for example, by a process of separating it from the gas by means of e.g. a collecting bag filter.

The condition to obtain uniform aggregate of carbon black of the present invention is to make the condition of the reaction zone to form the carbon black uniform. Here, the degree of uniformity required may be at such a level that the specific aggregate distribution of the present invention can be obtained. The detailed condition for a furnace method will be described hereinafter. However, so long as the condition for making the condition in the reaction zone uniform, is satisfied, it is possible to obtain uniform aggregate of carbon black of the present invention, for example, even in a plasma flame. The combustion zone is desired to be a sufficiently high temperature atmosphere so that the starting material hydrocarbon can be uniformly vaporized and thermally decomposed, and the temperature is preferably at least 1,600° C., more preferably from 1,700 to 2,400° C. Another condition desired for the combustion zone is to suppress the oxygen concentration in the combustion gas as far as possible. If oxygen is present in the combustion gas, partial combustion of the starting material hydrocarbon is likely to take place in the reaction zone, whereby non-uniformity in the reaction zone is likely to result. The oxygen concentration in the combustion gas is preferably at most 3%, more preferably from 0.05 to 1%.

Introduction of the starting material hydrocarbon into the reaction zone is preferably carried out so that the starting material is finely sprayed and uniformly dispersed in the furnace so that oil drops of the starting material hydrocarbon can uniformly be vaporized and thermally decomposed. As a method for fine spraying, it is effective to employ a method of atomizing by the combustion gas stream. The flow rate of the combustion gas at the position for introduction of the starting material hydrocarbon is preferably at least 250 m/sec, more preferably from 300 to 500 m/sec. Further, in order to uniformly disperse the starting material in the furnace, introduction of the starting material is preferably carried out in such a manner that the starting material hydrocarbon is introduced into the furnace from at least 2 nozzles.

The aggregate is believed to be formed in such a manner that the starting material hydrocarbon is thermally decomposed, and then condensed to form liquid drops, whereby nuclei of a precursor will form and mutually collide to one another to fuse and be carbonized to form the aggregate. Accordingly, it is considered to be advisable that the aggregate formation zone is free from a highly turbulent site due to e.g. a change in the flow path such as in a throttle portion. This can be accomplished by adjusting the residence time in the throttle portion to be at least 0.4 msec after introduction of the starting material hydrocarbon.

As an example of the carbon black production apparatus useful for obtaining uniform aggregate of carbon black of the present invention, a cross-sectional view of one furnace carbon black reactor is shown in FIG. 1. In FIG. 1, reference numeral 1 indicates a refractory furnace, numeral 2 a nozzle for introducing air for the reaction, numeral 3 a nozzle for introducing a fuel, numeral 4 a nozzle for introducing the starting material oil, numeral 5 a nozzle for introducing a fluid for terminating the reaction, numeral 6 a control valve, A the combustion zone, B the reaction zone, and C the reaction termination zone.

Now, the present invention will be described in further detail with reference to Examples. However, it should be understood that the present invention is by no means restricted to such specific Examples.

EXAMPLES 1 to 7

A carbon black furnace was installed which had a structure in which a combustion zone having an internal diameter of 50 mm and a length of 1,400 mm and provided with a duct for introducing air and a combustion burner, a starting material introduction zone connected from the combustion zone and made of a narrow diameter portion having an inner diameter of 50 mm and a length of 300 mm and having a plurality of starting material nozzles provided along the circumference, a rear reaction zone having an inner diameter of 100 mm and a length of 6,000 mm and equipped with a quenching apparatus, and a control valve having an inner valve diameter of 80 mm as a throttle mechanism, were sequentially connected.

Carbon black of the present invention was produced under various conditions as identified in Table 1, by the above furnace, by using creosote oil as the fuel and the starting material hydrocarbon. Various properties of the obtained carbon black are shown in Table 2. (The specific surface area and the cDBP oil absorption are represented by values in accordance with ASTM D3037-88 and ASTM D3493-88, respectively.)

Dmod and D½ are represented by values measured by a particle size distribution measuring apparatus of a disk centrifuge type ("DCF Model 3", manufactured by JL Automation Co.) by using a 20% ethanol solution as the spinning liquid. The stokes diameter at the point of the peak thus measured was indicated by Dmod and the half width of the stokes diameter at the point of the peak was indicated by D½.

For the measurement of PVC blackness, carbon black of the present invention thus obtained was added to a PVC resin and dispersed by a twin roll mill, followed by sheeting to obtain a test specimen, whereupon blackness of the test specimen was visually evaluated and represented by a value relative to the standard values of 1 and 10 points which correspond to blackness of carbon black #40 and #45, respectively, manufactured by Mitsubishi Chemical Corporation.

The dispersibility index was evaluated by the following method.

The dispersed state in a PE resin was observed, and the number of non-dispersed agglomerates was counted, whereby the larger the number i.e. the larger the dispersibility index, the poorer the dispersibility.

Test sample carbon black was blended to a LDPE resin, followed by kneading at 115° C. for 4 minutes by a 250 cc Banbury mixer.

Blend conditions

LDPE resin: 101.89 g

Calcium stearate: 1.39 g

"Irganox 1010"(antioxidant): 0.87 g

Test sample carbon black: 69.43 g

Then, the mixture was diluted to a carbon black concentration of 1% by a twin roll mill at 120° C.

Diluted compound preparation conditions

LDPE resin: 58.3 g

Calcium stearate: 0.2 g

Carbon black 40%—incorporated resin: 1.5 g

The diluted compound was sheeted with a slit width of 0.3 mm, and the obtained sheet was cut into chips, which were then formed into a film of 65±3 μm on a hot plate of 240° C. The diameter distribution of non-dispersed agglomerates having diameters of at least 0.2 mm in a field of 3.6 mm×4.7 mm, was measured by an optical microscope with 20 magnifications, and the total area of such agglomerates was calculated. The total area was divided by a standard area which is the area of a non-dispersed agglomerate having a diameter of 0.35 mm, to calculate it as the number of standard agglomerates. Such observation was carried out with respect to at least 16 fields, and the average value was taken as a dispersibility index.

The obtained carbon black of the present invention was compared with #40 and #47 manufactured by Mitsubishi Chemical Corporation.

As shown in Table 2, Examples 1 to 9 show small D½/Dmod and high levels of blackness as compared with Comparative Examples. Further, the dispersibility indices are low, thus indicating good dispersibility.

TABLE 1

| Conditions | Amount of fuel (kg/h) | Amount of air (km³/h) | Temp. of combustion gas (°C.) | Oxygen concentration in combustion gas (dry vol %) | Flow rate of combustion gas (m/s) | Amount of starting material (kg/h) | Pressure in the furnace (kg/cm²g) | Potassium concentration (ppm) | Residence time in throttle portion (ms) |
|---|---|---|---|---|---|---|---|---|---|
| Example 1 | 61 | 586 | 1622 | 0.6 | 336 | 82 | 1.0 | 0 | 0.8 |
| Example 2 | 58 | 531 | 1777 | 0.1 | 435 | 77 | 0.5 | 0 | 0.5 |
| Example 3 | 61 | 573 | 1780 | 0.2 | 358 | 82 | 1.0 | 0 | 0.6 |
| Example 4 | 46 | 427 | 1771 | 0.1 | 331 | 62 | 0.5 | 0 | 0.6 |
| Example 5 | 55 | 513 | 1752 | 0.1 | 317 | 74 | 1.0 | 0 | 0.8 |
| Example 6 | 61 | 566 | 1785 | 0.1 | 351 | 62 | 1.0 | 0 | 0.4 |
| Example 7 | 55 | 513 | 1745 | 0.1 | 315 | 56 | 1.0 | 0 | 0.8 |
| Example 8 | 56 | 535 | 1756 | 0.5 | 391 | 99 | 0.7 | 98 | 0.7 |
| Example 9 | 56 | 535 | 1748 | 0.5 | 391 | 97 | 0.7 | 495 | 0.7 |

Potassium concentration: Concentration (ppm) of potassium in the starting material
Number of nozzles for starting material: 2 nozzles

TABLE 2

| Characteristics | N2SA (m2/g) | cDBP (ml/100 g) | Dmod (nm) | D1/2 (nm) | D1/2/Dmod | PVC blackness | Dispersibility index |
|---|---|---|---|---|---|---|---|
| Example 1 | 120 | 90 | 70 | 33 | 0.47 | 4.7 | 11 |
| Example 2 | 128 | 93 | 68 | 34 | 0.50 | 5.7 | 13 |
| Example 3 | 132 | 94 | 66 | 35 | 0.53 | 4.7 | 15 |
| Example 4 | 141 | 95 | 64 | 34 | 0.53 | 6.0 | 13 |
| Example 5 | 147 | 93 | 72 | 38 | 0.53 | 5.3 | 11 |
| Example 6 | 204 | 97 | 58 | 28 | 0.48 | 7.3 | 16 |
| Example 7 | 236 | 93 | 60 | 31 | 0.52 | 7.7 | 15 |
| Example 8 | 112 | 77 | 68 | 35 | 0.52 | 5.7 | 28 |
| Example 9 | 121 | 59 | 60 | 30 | 0.50 | 8.0 | 78 |
| Comparative Examples | | | | | | | |
| #40 | 108 | 85 | 81 | 65 | 0.80 | 1.0 | 15 |
| #47 | 130 | 51 | 61 | 44 | 0.72 | 6.7 | 133 |

As described in the foregoing, when used as a black pigment for a resin coloring agent, a printing ink or a coating material, carbon black of the present invention satisfies both blackness and dispersibility, which have been believed to be in an antinomic relation and hardly satisfied simultaneously. Thus, the carbon black of the present invention is very useful as a black pigment for a resin coloring agent, a printing ink or a coating material.

What is claimed is:

1. A carbon black having a D½/Dmod ratio of at most 0.53, wherein Dmod is from 20 to 80 nm.

2. The carbon black according to claim 1, which has a D½/Dmod ratio of from 0.30 to 0.50.

3. The carbon black according to claim 1, which has a cDBP oil absorption of at most 90 cc/100 g.

4. The carbon black according to claim 2, which has a cDBP oil absorption of at most 90 cc/100 g.

* * * * *